United States Patent [19]

Werdecker et al.

[11] Patent Number: 4,818,626

[45] Date of Patent: Apr. 4, 1989

[54] METHOD FOR PRODUCING SINTERED METALIZED ALUMINUM NITRIDE CERAMIC BODIES

[75] Inventors: Waltraud Werdecker, Hanau; Dieter Brunner, GroBostheim; Martin Kutzner, Neuberg, all of Fed. Rep. of Germany

[73] Assignee: W. C. Heraeus GmbH, Hanau Lauten, Fed. Rep. of Germany

[21] Appl. No.: 81,322

[22] Filed: Aug. 3, 1987

[30] Foreign Application Priority Data

Sep. 4, 1986 [DE] Fed. Rep. of Germany ....... 3630066

[51] Int. Cl.$^4$ .......................... B05D 5/12; B22B 15/04
[52] U.S. Cl. ...................................... 428/469; 427/96; 427/123; 427/126.2; 427/126.3; 427/226; 427/229; 427/212; 427/376.1; 427/376.6; 427/380; 428/45; 428/697; 428/678; 428/679; 428/704; 428/901
[58] Field of Search .............. 427/229, 96, 226, 126.2, 427/123, 282, 380, 376.6, 376.3, 126.3; 428/901, 457, 697, 648, 699, 704, 469

[56] References Cited

U.S. PATENT DOCUMENTS

| | | | |
|---|---|---|---|
| 4,278,702 | 7/1981 | Jeng | 427/282 |
| 4,595,605 | 6/1986 | Martin et al. | 427/282 |
| 4,626,451 | 12/1986 | Tanaka et al. | 427/229 |
| 4,663,189 | 5/1987 | Borland | 427/123 |

FOREIGN PATENT DOCUMENTS 0043029 1/1982 European Pat. Off. .
0153737 9/1985 European Pat. Off. .
0177772 4/1986 European Pat. Off. .

Primary Examiner—Janyce Bell
Attorney, Agent, or Firm—Frishauf, Holtz, Goodman & Woodward

[57]      ABSTRACT

To permit using a single firing step, sintered aluminum nitride ceramic bodies provided with firmly adhering electrically conductive films or resistive layers can be produced by sintering of the green ceramic bodies and the films or layers in common, if these films or layers additionally contain a mixture of aluminum nitride and rare earth metal oxide.

22 Claims, 1 Drawing Sheet

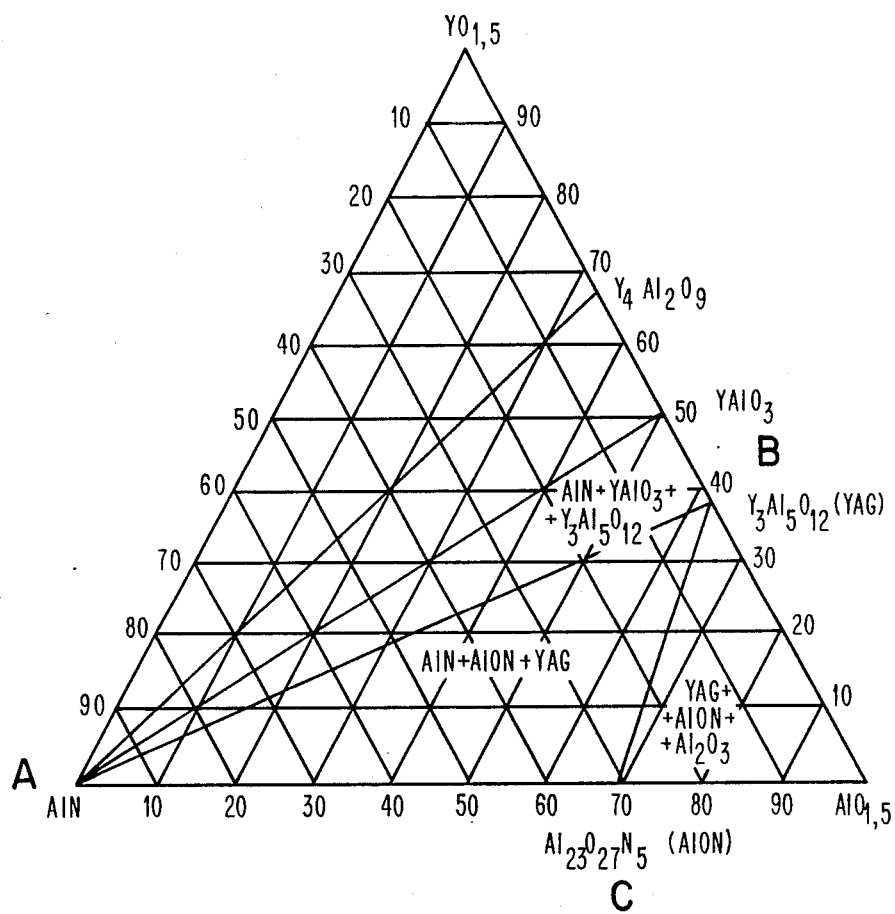

METHOD FOR PRODUCING SINTERED METALIZED ALUMINUM NITRIDE CERAMIC BODIES

The present invention relates to a method for producing sintered metalized aluminum nitride ceramic bodies, with application and firing of a metalizing paste containing a powdered metalizing agent.

BACKGROUND

Metalized ceramic bodies can be obtained by metalizing either fired or unfired—or green—ceramic bodies. Metalizing the green ceramic ware has the advantage that firing is done only once and is used particularly in the production of multi-layer ceramic substrates.

One method of metalizing green ceramic ware and sintering the metalizing and the ceramic in common to produce a multi-layer ceramic substrate from ceramic sheets having a metallurgy pattern and/or metal-filled via holes is described, for example, in European Pat. No. 43 029. An electrically conductive paste, for example a molybdenum paste, is applied to and introduced into suitable embodied green sheets, for example comprising a mixture of 89% by weight of aluminum oxide, 11% of weight of a glass and a liquid vehicle. Then the green ceramic sheets and the molybdenum metalizing are fired or sintered in common (co-firing, simultaneous sintering).

In the method for producing multi-layer ceramic chip carrier modules known from European Pat. No. 50 903, the conductor paste, for example a tungsten or molybdenum paste, is once again applied to the ceramic green sheets and sintered in common with it at 900°–1550° C. The ceramic in this case may be aluminum oxide, beryllium oxide, steatite, mullite or barium titanate, for example.

In the method known from European Pat. No. 61 010 as well, a refractory metal layer is printed onto an unfired ceramic substrate. The metalizing layer contains the refractory metal molybdenum, tantalum or tungsten and optionally up to 5% by weight of a glass frit as an additional inorganic component and also contains an organic vehicle. The metalizing layer is sintered at the same time as the unfired substrate. The presence of a thin film of palladium catalytically influences the sintering of the metal. If the ceramic comprises aluminum oxide, the sintering is performed particularly at 1600° C. in wet hydrogen.

European Patent Application No. 124 836 relates to non-oxide ceramic bodies, for instance of silicon nitride, provided with conductive coatings of molybdenum or tungsten silicide, which may optionally contain a nitride of a metal of column IVa of a periodic table (European convention), such as titanium nitride. The metalized ceramic bodies are produced by applying a metal molybdate or metal tungstate to the sintered ceramic, melting the molybdate or tungstate and sintering in a reducing atmosphere.

Circuit substrates of aluminum nitride ceramic, which for instance contains yttrium oxide to increase its thermal conductivity and to make it wettable, having electrically conductive films or layers are known from European Patent Application No. 153 737. The films are produced by firing of thick-film pastes applied to sintered aluminum nitride ceramic. A strong bond of the films is accomplished by using thick-film pastes containing copper oxide, lead or silicon, or by causing an oxide film to form on the ceramic.

To cause the densification temperature of the metal member to be closer to or identical with curing temperature of the substrate, it is possible—as proposed in European Patent Application No. 177 772—to add to the metal, which is typically in the form of a paste, a metal, a metal oxide, or an organometallic compound that is capable of decomposition into the metal or metal oxide. Sintering is done at 500°–1800° C. in the absence or presence of a reducing atmosphere.

German Patent Disclosure Document DE-OS No. 33 40 926 relates to substrate structures having conductor pathes comprising zirconium boride or tantalum boride, or comprising tungsten, molybdenum or tantalum. They are produced by screen printing the conductor pathes onto pre-shaped sheets, obtained by pressing powdered silicon carbide with a small quantity of beryllium oxide as a sintering aid, and then hot-pressing the product in argon, helium or nitrogen. Instead of the silicon carbide, silicon nitride or boron nitride may for instance be contained in the substrate structures.

The Invention

It is the objected of the invention to discover a method for metalizing ceramic bodies, with application and firing of a metalizing paste containing a powdered metalizing agent, which is suitable for producing sintered metalized aluminum nitride ceramic bodies in a single firing step.

Briefly, a metalizing paste, comprising an organic vehicle and dispersed therein an inorganic component comprising from 90 to 99% by weight of the metalizing agent and from 1 to 10% weight of a powdered mixture of from 50 to 95% by weight of aluminum nitride and from 5 to 50% by weight of rare earth metal oxide, is applied to green aluminum nitride ceramic bodies; the metalizing paste and ceramic bodies are dried; and then the metalized bodies are fired or sintered by heating to from 1750° to 2000° C. in the presence of nitrogen or a mixture of nitrogen and hydrogen.

The method according to the invention has proven particularly satisfactory if the metalizing agent comprises 1.
  (a) titanium nitride
  (b) zirconium nitride and/or
  (c) hafnium nitride,
or
2.
  (a) tungsten and/or
  (b) molybdenum and is used in the form of a plurality of powders having different particle sizes, preferably in the form of two powders with the average particle sizes at a ratio of approximately 1:5 to approximately 1:8. By using powders of different particle sizes, metalizing films having increased conductivity are obtained.

The following powder mixtures are preferred:

1.
  (a) titanium nitride: 65–75% by weight of a powder having an average particle size of 3–6 microns and 25–35% by weight of a powder having an average particle size of 0.6–1 microns.
  (b) zirconium nitride: 65–75% by weight of a powder having an average particle size of 4–10 microns and 25–35% by weight of a powder having an average particle size of 0.8–3 microns.

(c) hafnium nitride: 90–99% by weight of a powder having an average particle size of 5–10 microns and 1–10% by weight of a powder having an average particle size of 0.8–2 microns.

2.

(a) tungsten: 62–78% by weight of a powder having an average particle size of 2–7 microns and 22–38% by weight of a powder having an average particle size of 0.4–1.2 microns.

(b) molybdenum: 75–85% by weight of a powder having an average particle size of 0.7–1.2 microns and 15–25% by weight of a powder having an average particle size of 4–8 microns.

It has been found that a particularly good influence on the bond strength can be attained if in the metalizing paste, an aluminum nitride powder having an average particle size of less than 10 microns and a specific surface area between 2 and 40 m$^2$/g, preferably between 4 and 7 m$^2$/g, is used.

As the rare earth metal oxide (a term that should be understood to mean the oxides of the elements scandium, yttrium and lanthanum through lutetium), yttrium oxide has proven particularly satisfactory. Optionally, up to 50% by weight of the yttrium oxide can be replaced by aluminum oxide ($\alpha$- or $\gamma$-aluminum oxide).

The content of the inorganic component in the metalizing paste is from 50 to 90% by weight, preferably 64–82% by weight. The inorganic component is processed in a known manner, with conventional organic vehicles, to make a paste of suitable viscosity.

The metalized aluminum nitride ceramic bodies produced by the method according to the invention are virtually free of cracks and strains, despite the different coefficients of thermal expansion of the ceramic and the metalizing.

The metalizing adheres firmly to the ceramic bodies and can be coated with additional metal layers, for instance layers of copper or nickel, either electroless or by electroplating.

The method according to the invention is particularly well suited producing single- and multi-layer substrates for integrated circuits.

If the metalized aluminum nitride ceramic bodies obtained by the method according to the invention are to be used for electrical and electronic circuits, then it has proven satisfactory to add from 0.01 to 15% by weight of yttrium oxide powder to the aluminum nitride powder used for producing the green ceramic bodies (see European Patent Application No. 153 737, for example). The powdered mixtures of aluminum nitride and yttrium oxide are processed with conventional organic binders, plasticizers or organic solvents in a known manner to make moldable compositions, form which green ceramic substrates are produced, preferably using tape casting or tape drawing methods.

The metalizing pastes are applied to the green ceramic substrates by known methods, preferably screen printing or spray coating. The green substrates provided with the paste are then dried by heating to 120°–300° C. at atmospheric pressure or in a vacuum, preferably down to 0.1 mbar, and then heated further in nitrogen or a mixture of nitrogen and hydrogen, initially slowly (at approximately 20 K/h up to approximately 500° C.) to 1750°–2000° C., preferably to 1800°–1900° C. The oxygen content of the nitrogen or nitrogen/hydrogen should be as low as possible. Preferably the partial pressure of the oxygen is less than 10$^{-6}$ atmospheres.

DESCRIPTION OF THE DRAWING

The single FIGURE is a three-phase diagram for AlN-Y$_2$O$_3$-Al$_2$O$_3$ in mole percent, useful for forming aluminum nitride ceramic bodies.

DETAILED DESCRIPTION

The following examples will serve to explain the method according to the invention.

EXAMPLE 1

Production of Green Aluminum Nitride Ceramic Substrates 62.17% by weight of aluminum nitride, over 99% pure 0.33% by weight of yttrium oxide, 99.99% pure 3.75% by weight of Butvar B 76 (polyvinylbutyral by Monsanto, USA)

3.33% by weight of Santicizer 160 (plasticizer of butylbenzylphthalate by Monsanto, USA)

0.50% by weight of Emerex 2423 (oleic acid by Emery, USA)

25.83% by weight of toluol 2.84% by weight of isopropanol 1.25% by weight of methylethylketone are used to produce green ceramic substrates by tape casting; the substrates are dried for 2 days, cut to size, taking shrinkage into account, to yield squares measuring 50.8 mm by 50.8 mm, and then dried for 2 days at 40° C. and at 25% relative humidity.

EXAMPLE 2

Production of Aluminum Nitride Ceramic Substrates Metalized with Tungsten Metalizing paste:

50% by weight of tungsten powder, average particle size 4 microns 24.75% by weight of tungsten powder, average particle size 0.6 microns 0.66% by weight of Butvar B 76 (polyvinylbutyral by Monsanto, USA)

0.20% by weight of Santicizer 160 (plasticizer of butylbenzylphthalate by Monsanto, USA)

7.00% by weight of terpineol 0.05% by weight of Emerex 2423 (oleic acid by Emery, USA)

14.28% by weight of toluol 1.00% by weight of methylethylketone 0.96% by weight of isopropanol 1.00% by weight of aluminum nitride, over 99.99% pure, average particle size less than 0.3 microns, specific surface area 31 m$^2$/g 0.10% by weight of cerium dioxide (analytically pure) are mixed with one another in a ball mill for 16 hours. Enough methylethylketone is then added to the mixture that the finished metalizing paste has a viscosity of 72,000 centipoise.

The metalizing paste is applied by the silkscreening method to green ceramic substrates produced in accordance with Example 1 and into via holes punched therein. The printed substrates are dried for 2 hours in a vacuum (1 mbar) at 160° C. and then heated in nitrogen, initially slowly to 500° C. and then quickly to 1840° C. and kept at that temperature for 1.5 hours.

The electrical resistance of the tungsten film is 170 m$\Omega$/□; the bond strength after nickel-plating is greater than 36 N/mm$^2$.

EXAMPLE 3

Production of Aluminum Nitride Ceramic Substrates Metalized with Hafnium Nitride Metalizing Paste:

100 g of hafnium nitride powder, particle size less than 45 microns, over 96% pure
6 g of aluminum nitride powder, average particle size 4.2 microns, specific surface area 4–4.5 m²g/, over 99% pure
0.3 g of yttrium oxide powder, average particle size 5 microns, 99.99% pure
200 g amyl acetate
are mixed with one another for 24 hours in a ball mill. The resultant mixture is dried, mixed with
10.2 g of Damar Varnish (O. G. Innes, USA)
32 g of pine oil ("Drakosett"-solvent by Hercules Corp., USA)
and homogenized in the cylinder mill. Then, enough of the pine oil is added that the finished metalizing paste has a viscosity of approximately 80,000 centipoise.

The metalizing paste is applied by silkscreening to green ceramic substrates produced in accordance with Example 1. The printed substrates are dried for 6 hours in air and then heated in nitrogen, initially slowly to 500° C., then quickly to 1840° C. and kept at that temperature for 1.5 hours.

The electrical resistance of the hafnium nitride film is $2.1 \pm 0.3 \Omega/\Box$.

EXAMPLE 4

Production of Green Aluminum Nitride Ceramic Substrates From a mixture of
60.87% by weight of aluminum nitride
0.41% by weight of yttrium oxide
3.86% by weight of Butvar B 76 (polyvinylbutyral by Monsanto, USA)
3.45% by weight of Santicizer 160 (plasticizer of butylbenzylphthalate by Monsanto, USA)
0.97% by weight of glycerol trioleate
3.04% by weight of methylethylketone
4.87% by weight of methylamylketone
4.26% by weight of isopropanol
2.44% by weight of toluol
15.83% of special boiling point gasoline 80/110 (special gasoline having a boiling range from 80°–110° C.), green ceramic substrates are produced by the tape casting method, dried for 6 hours, cut to size, taking shrinkage into account, to form squares 50.8 mm by 50.8 mm, and then dried for 48 hours at 40° C. and at 35% relative humidity.

EXAMPLE 5

Production of Aluminum Nitride Ceramic Substrates Metalized with Tungsten Metalizing paste:
65.2% by weight of tungstem powder, average particle size 4 microns
22.1% by weight of tungsten powder, average particle size 0.8 microns
6.6% of special boiling point gasoline 80/110 (special gasoline having a boiling range from 80°–110° C.),
0.9% by weight of isopropanol
0.6% by weight of methylamylketone
0.95% by weight of methylethylketone
0.65% by weight of toluol
2.85% by weight of aluminum nitride powder, average particle size 0.5 microns, specific surface area 10 m²/g, over 99% pure
0.07% by weight of -aluminum oxide, over 98% pure
0.08% by weight of yttrium oxide
are mixed with one another for 24 hours in a ball mill. The mixture obtained is dried, mixed with
10.2 g of Damar Varnish (O. G. Innes, USA)
32 g of pine oil ("Drakosett"-solvent by Hercules Corp., USA)
and homogenized in the cylinder mill. Then enough of the pine oil is added that the finished metalizing paste has a viscosity of approximately 60,000 centipoise.

The metalizing paste is applied by silkscreening to green ceramic substrates produced in accordance with Example 4. The printed substrates are dried for 24 hours and then heated in nitrogen-hydrogen mixture (3% hydrogen), initially slowly to 500° C., then quickly to 1840° C. and kept at that temperature for 1.5 hours.

The tungsten films exhibit a uniform gray coloration; the bond strength is greater than 42 N/mm², and after nickel-plating the electrical resistance is 50 mΩ/$\Box$.

EXAMPLE 6

Production of Green Aluminum Nitride Ceramic Substrates

From a mixture of
61.5% by weight of aluminum nitride, over 99% pure
0.6% by weight of yttrium oxide, over 99,9% pure
0.4% by weight of γ-aluminum oxide, ober 99% pure
1.2% by weight of menhaden oil (Haynie)
22% by weight of trichloroethane
8.8% by weight of ethanol (analytically pure)
2.5% by weight of Butvar B 98 (polyvinylbutyral by Monsanto, USA)
1.0% by weight of polyethylene glycol 400 (Merck, Federal Republic of Germany)
2.0% by weight of Santicizer 160 (plasticizer of butylphenylphthalate by Monsanto, USA)
green ceramic substrates are produced by the tape casting method, dried for 2 days, cut to size, taking shrinkage into account, to make squares measuring 50.8 mm by 50.8 mm, and then dried for 3 days at 40° C. and at 35% relative humidity.

EXAMPLE 7

Production of Aluminum Nitride Ceramic Substrates Metalized with Molybdenum Metalizing Paste:
49% by weight of molybdenum powder, average particle size 5–7 microns
13% by weight of molybdenum powder, average particle size 0.8–1 microns
1% by weight of aluminum nitride, average particle size 4.2 microns, specific surface area 4–4.5 m²/g
0.04% by weight of γ-aluminum oxide
0.06% by weight of yttrium-oxide
9.0% of Damar Varnish (O. G. Innes, USA)
25.0% by weight of pine oil ("Drakosett"-solvent by Hercules Corp., USA)
2.9% by weight of trichloroethane
are mixed with one another for 16 hours in a ball mill. Then enough of the pine oil is added that the finished metalizing paste has a viscosity of approximately 70,000 centipoise.

The metalizing paste is applied by silkscreening to green ceramic substrates made in accordance with Example 6. The printed substrates are dried for 2 hours in a vacuum (1 mbar) at 200° C. and then heated in nitrogen, initially slowly to 500° C. and then quickly to 1780° C. and kept at that temperature for 4 hours.

The electrical resistance of the molybdenum film is 110 mΩ/□, and the bond strength after nickel-plating approximately 30 N/mm².

EXAMPLE 8

Production of Aluminum Nitride Ceramic Substrates Metalized with Titanium Nitride
Metalizing Paste:
52.5% by weight of titanium nitride powder, average particle size 4.3 microns
21.1% by weight of titanium nitride, average particle size 0.6 microns
1.0% by weight of aluminum nitride, average particle size 4.2 microns, specific surface area 4–4.5 m²/g
0.05% by weight of γ-aluminum oxide
0.1% by weight of yttrium oxide
15.25% of special boiling point gasoline 80/110 (special gasoline having a boiling range from 80°–110° C.),
2.0% by weight of methylethylketone
2.0% by weight of toluol
1.0% by weight of methylamylketone
2.0% by weight of isopropanol
2.0% by weight of Butvar B 76 (polyvinylbutyral by Monsanto, USA)
1.0% by weight of Santicizer 160 (plasticizer of butylphenylphthalate by Monsanto, USA)
are mixed with one another for 24 hours in a ball mill. Enough methylethylketone is then added to the mixture that the finished metalizing paste has a viscosity of approximately 60,000 centipoise.

The metalizing paste is applied by silkscreening method to green ceramic substrates produced in accordance with Example 4. The printed substrates are dried for 2 hours in a vacuum (1 mbar) at 250° C. and then heated in nitrogen-heated mixture (3% hydrogen), initially slowly to 500° C. and then quickly to 1840° C. and held at that temperature for 1.5 hours.

EXAMPLE 9

Production of Aluminum Nitride Ceramic Substrates Metalized with Zirconium Nitride
Metalizing Paste:
44.4% by weight of zirconium nitride powder, average particle size 5.8 microns
18.1% by weight of zirconium nitride, average particle size 1.8 microns
1.2% by weight of aluminum nitride, average particle size 4.2 microns, specific surface area 4–4.5 m²/g
0.1% by weight of γ-aluminum oxide
0.2% by weight of yttrium oxide
18.0% of special boiling point gasoline 80/110 (special gasoline having a boiling range from 80°–110° C.),
2.2% by weight of Butvar B 76 (polyvinylbutyral by Monsanto, USA)
0.9% by weight of Santicizer 160 (plasticizer of butylphenylphthalate by Monsanto, USA)
0.7% by weight of menhaden oil (Haynie)
4.2% by weight of methylethylketone
4.0% by weight of methylamylketone
6.0% by weight of isopropanol
are mixed with one another for 24 hours in a ball mill. Then enough methylethylketone is added to the mixture that the finished metalizing paste has a viscosity of approximately 56,000 centipoise.

The metalizing paste is applied by silkscreening method to green ceramic substrates produced according to Example 4. The printed substrates are dried for 2 hours in a vacuum (1 mbar) at 250° C. and then heated in nitrogen, initially slowly to 500° C. and then quickly to 1840° C. and kept at that temperature for 1.5 hours.

Other ceramics can also be metalized by the methods described above for aluminum nitride ceramics, using the above-mentioned metalizing agents. Nitride and oxide nitride ceramics as well as mixtures thereof can also be produced in the form of green ceramic sheets and dry-pressed.

These metalizing agents can especially be used on mixtures of aluminum nitride and silicon carbide and optionally sintering aids as well as on aluminum oxide nitride, mixtures of aluminum oxide nitride with aluminum nitride, mixtures of aluminum oxide nitride, aluminum nitride and yttrium-aluminum-garnet, characterized by the triangle ABS (see the single FIGURE) located inside the three-phase diagramm AlN-Y₂O₃-Al₂O₃, as well as on mixtures in the thus-designated composition range having further additives, such as rare earth metal oxides, aluminum oxide, alkali earth metal oxides and alkali earth metal fluorides. These mixtures are therefor to be included in the meaning of aluminum nitride ceramic bodies as used in the claimes hereof.

We claim:

1. A method for producing a sintered metalized aluminum nitride ceramic body, comprising the steps of:
   applying, onto a green aluminum nitride ceramic body, a metalizing paste comprised of about 50 to 90% of an inorganic component which comprises 90 to 99% by weight of powdered metalizing agent selected from the group consisting of tungsten, molybdenum, hafnium nitride, zirconium nitride and titanium nitride and 1 to 10% by weight of a powdered mixture comprising 5 to 95% by weight of aluminum nitride and 5 to 50% by weight of a rare earth metal oxide which is dispersed in an amount of about 10 to about 50% of anorganic vehicle to form the metalizing paste; thereafter
   drying the metalizing paste; and thereafter
   sintering the metalizing paste and the green ceramic body by heating to a temperature of from about 1750° C. to about 2000° C. in a nitrogen or nitrogen-hydrogen mixture atmosphere to convert the metalizing paste and the green ceramic body into said sintered metalized aluminum nitride body.

2. The method of claim 1, wherein the drying of the metalizing paste comprises heating to form about 120° to about 300° C. and then heating under nitrogen or a mixture of nitrogen and hydrogen.

3. The method of claim 1, wherein the metalizing agent comprises titanium nitride, zirconium nitride and/or hafnium nitride.

4. The method of claim 1, wherein the metalizing agent comprises tungsten and/or molybdenum.

5. The method of claim 1, wherein the metalizing agent is present in the form of a mixture of a plurality of powders having different average particle sizes.

6. The method of claim 5, wherein the mixture comprises two powders, the average particle sizes of which are in a ratio of approximately from 1:5 to approximately 1:8 to one another.

7. The method of claim 6, wherein the aluminum nitride powder contained in the metalizing paste has an average particle size of les than 10 microns and a specific surface area of between about 2 and about 40 m²/g.

8. The method of claim 7, wherein the specific surface area of the nitride powder is between 4 and 7 m²/g.

9. The method of claim 8, wherein the rare earth metal oxide is yttrium oxide.

10. The method of claim 8, wherein the rare earth metal oxide is a mixture of yttrium oxide with 0 to 50% by weight of aluminum oxide.

11. The method of claim 10, wherein the metalizing agent is tungsten.

12. The method of claim 10, wherein the metalizing agent is titanium nitride.

13. The method of claim 10, wherein the metalizing agent is zirconium nitride.

14. The method of claim 5, wherein the metalizing agent is powdered tungsten composed of 62-78% by weight of a powder having an average particle size of 2-7 microns and 22-38% by weight of a powder having an average size of 0.4-1.2 microns.

15. The method of claim 5, wherein the metalizing agent is powdered molybdenum composed of 75-85% by weight of powder having an average particle size of 0.7-1.2 microns and 15-25% by weight of a powder having an average size of 4-8 microns.

16. The method of claim 5, wherein the metalizing agent is powdered titanium nitride composed of 65-75% by weight of a powder having an average particle size of 3-6 microns and 25-35% by weight of a powder having an average particle size of 0.6-1 microns.

17. The method of claim 5, wherein the metalizing agent is powdered zirconium nitride composed of 65-75% by weight of a powder having an average particle size of 4-10 microns and 25-35% by weight of a powder having an average particle size of 0.8-3 microns.

18. The method of claim 5, wherein the metalizing agent is powdered hafnium nitride composed of 90-99% by weight of a powder having an average particle size of 5-10 microns and 1-10% by weight of a powder having an average particle size of 0.8-2 microns.

19. The method of claim 1, wherein the aluminum nitride powder contained in the metalizing paste hase an average particle size of less than 10 microns and a specific surface area of between about 2 and about 40 $m^2/g$.

20. The method of claim 19, wherein the rare earth metal oxide is a mixture of yttrium oxide with 0 to 50% by weight of aluminum oxide.

21. The method of claim 1, wherein the step of applying the metalizing paste comprises screen printing of the paste onto the green ceramic body and into via holes therein.

22. A microcircuit prepared by the method of claim 1.

* * * * *